United States Patent
Cheung et al.

(10) Patent No.: US 7,557,640 B2
(45) Date of Patent: *Jul. 7, 2009

(54) REGULATED CHARGE PUMP WITH DIGITAL RESISTANCE CONTROL

(75) Inventors: Yee Ling Cheung, Irvine, CA (US); Chun-Ying Chen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/585,841

(22) Filed: Oct. 25, 2006

(65) Prior Publication Data
US 2007/0120591 A1    May 31, 2007

Related U.S. Application Data

(63) Continuation of application No. 10/787,953, filed on Feb. 27, 2004, now Pat. No. 7,142,039.

(51) Int. Cl.
*G05F 1/10* (2006.01)
*G00F 3/02* (2006.01)

(52) U.S. Cl. .................................................. 327/536
(58) Field of Classification Search ......... 327/535–537, 327/589; 363/56–60
See application file for complete search history.

(56) References Cited

U.S. PATENT DOCUMENTS

| | | | | |
|---|---|---|---|---|
| 5,362,988 A | * | 11/1994 | Hellums | 327/543 |
| 6,486,728 B2 | * | 11/2002 | Kleveland | 327/536 |
| 2004/0246044 A1 | * | 12/2004 | Myono et al. | 327/536 |

* cited by examiner

*Primary Examiner*—Quan Tra
(74) *Attorney, Agent, or Firm*—Sterne, Kessler, Goldstein & Fox P.L.L.C.

(57) ABSTRACT

A charge pump includes a resistor divider connected between an output voltage node and ground and a comparator inputting a reference voltage at one input, and a divided voltage from the resistor divider at another input. A digital control circuit is enabled by the comparator. A first transistor and a second transistor are in series between an input voltage node and the ground, both transistors controlled by the digital control circuit. A pump capacitor is connected between to the output voltage node and between the first and second transistor, and being charged by turning the first and second transistors on and off. A first diode is between the pump capacitor and the input voltage node. A second diode between the pump capacitor and the output voltage node. A reservoir capacitor between the output voltage node and ground. The digital control circuit comprises a first shift register. The first transistor comprises a first plurality of parallel transistors, the first shift register includes any of a first plurality of DQ, RS or JK flip flops connected in series, and outputs of the flip flops control gates of the first plurality of parallel transistors.

6 Claims, 7 Drawing Sheets

REGULATED CHARGE PUMP WITH DIGITAL RESISTANCE CONTROL

CROSS-REFERENCE TO RELATED APPLICATIONS

This application is a continuation of U.S. application Ser. No. 10/787,953, filed Feb. 27, 2004, which is herein incorporated by reference in its entirety.

BACKGROUND OF THE INVENTION

1. Field of the Invention

The present invention is related to charge pumps, and more particularly, to digitally controlled active feedback charge pumps.

2. Related Art

A charge pump regulator is a DC/DC switching converter that converts a lower input voltage and regulates to a higher output voltage or vice versa. The advantage of a charge pump is that it stores energy in a relatively cheaper capacitor instead of in an inductor. Commonly used topologies in most of the commercial integrated circuits are "skip" mode and "linear" (constant frequency) mode.

The voltage regulation of the charge pump is controlled using both the "skip" and "linear" modes. The "skip" mode operation is depicted in FIGS. 1A-1B.

The circuit includes two capacitors, a pumping capacitor Cpump and a reservoir capacitor Cres. These storage elements provide current to the load at the output. The output voltage Vout is set by the ratio of resistors R1, R2 and is governed by Vout=Vref*(R1+R2)/R2. In FIG. 1B, during φ1, both transistors M1, M3 are turned on, and transistors M2, M4 are turned off. Node "x" is charged to Vin. During φ2, transistors M2, M4 are turned on and transistors M1, M3 are turned off. Cres is being charged to the desired output voltage. The same charging sequence continues until a comparator 101 detects an output higher than the desired voltage, and then disables a clock generator 102. The circuit skips switching (i.e., idles) until the output voltage Vout drops lower. The clock generator 102 is then reactivated. The same principle applies to FIG. 1A except that the transistors M3, M4 are replaced by diodes D1, D2 respectively (this circuit is known as a Dickson charge pump).

In FIG. 2, a Dickson charge pump operating in a constant frequency mode is illustrated. When the Dickson charge pump operates at a constant frequency, there are no skip (idle) cycles. The output of the comparator 101 feeds into a control circuit 202, which generates a DC voltage to control the on-resistance of transistor M2 under different loading conditions. Hence, voltage regulation at Vout can be achieved by adjusting the I*R drop across the transistor M2.

A third regulation scheme is to combine the "skip" and "linear" mode to form an active-control circuit. This is depicted in FIG. 3. In this control scheme, skip cycles are inserted, in addition to the use of resistance control.

FIG. 4 shows an operating principle of the Dickson charge pump with active-cycle control. Let Qc be the charge transferred to the Cpump during a charging cycle and Qp be the charges delivered to the load and to the Cres during a pumping cycle. Mathematically, |Qc|=|Qp|. Hence the average current during the time tp is |Ic|=|IP|, Ip is the current passing through D2, and $I_L$ is the load current, where $$I_p = I_L + I_L + \frac{(I_L * tw)}{tp}.$$

$I_L$ is also the charging current to Cres. ($I_L$*tw) is the reserved charge to supply $I_L$ in idle.

Vout can be expressed as follows:

$$Vout=(Vmbat-VF-IcRn)+(Vcc-VF-IpRp)$$

where Rp, Rn are the on resistances of M2, M1 respectively, Vmbat is a battery voltage, VF is the forward junction voltage of the diodes D1, D2.

$$Vout = Vmbat + Vcc - 2VF - I_L\left(2 + \frac{tw}{tp}\right)(Rp + Rn)$$

Here, the $$\left(2 + \frac{tw}{tp}\right)$$

term is the skip control, and the (Rp+Rn) term is the resistance control.

The above equation shows how the output voltage can be controlled by adjusting the resistance of M1, M2 and by inserting skip cycles. Note that Vmbat can be the same as Vcc if the anode of the diode D1 is tied to the source of M2.

The problem with the approaches above is as follows: if analog feedback is used, there are often stability issues that need to be addressed fairly carefully. Additionally, pulse width modulation (PWM) schemes can be device-intensive in terms of implementation. Also, feedback control for pulse width modulation circuits frequently has stability problems, and needs to be very carefully designed. For example, such circuits may require lead-lag compensation, or may require transistors that number in the tens or even hundreds to achieve the pulse-width modulation with stable feedback control.

SUMMARY OF THE INVENTION

The present invention relates to a regulated charge pump with digital resistance control that substantially obviates one or more of the disadvantages of the related art.

More particularly, in an exemplary embodiment of the present invention, a charge pump includes a resistor divider connected between an output voltage node and ground, and a comparator inputting a reference voltage at one input, and a divided voltage from the resistor divider at another input. A digital control circuit is enabled by the comparator. A first transistor and a second transistor are in series between an input voltage node and the ground, both transistors controlled by the digital control circuit. A pump capacitor is connected between to the output voltage node and between the first and second transistor, and being charged by turning the first and second transistors on and off. A first diode is between the pump capacitor and the input voltage node. A second diode between the pump capacitor and the output voltage node. A reservoir capacitor between the output voltage node and ground. The digital control circuit comprises a first shift register. The first transistor comprises a first plurality of parallel transistors, the first shift register includes any of a first plurality of DQ, RS or JK flip flops connected in series, and outputs of the flip flops control gates of the first plurality of parallel transistors. The digital control circuit comprises a second shift register. The second transistor comprises a second plurality of parallel transistors. The shift register includes any of a first plurality of DQ, RS or JK flip flops connected in series, and outputs of the flip flops control gates of the second plurality of parallel transistors.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

This invention describes a new circuit technique for implementing a Dickson charge pump with active-cycle regulation. An improved "linear" mode control is implemented together with a conventional "skip" control circuitry in this invention.

Figure 1A:
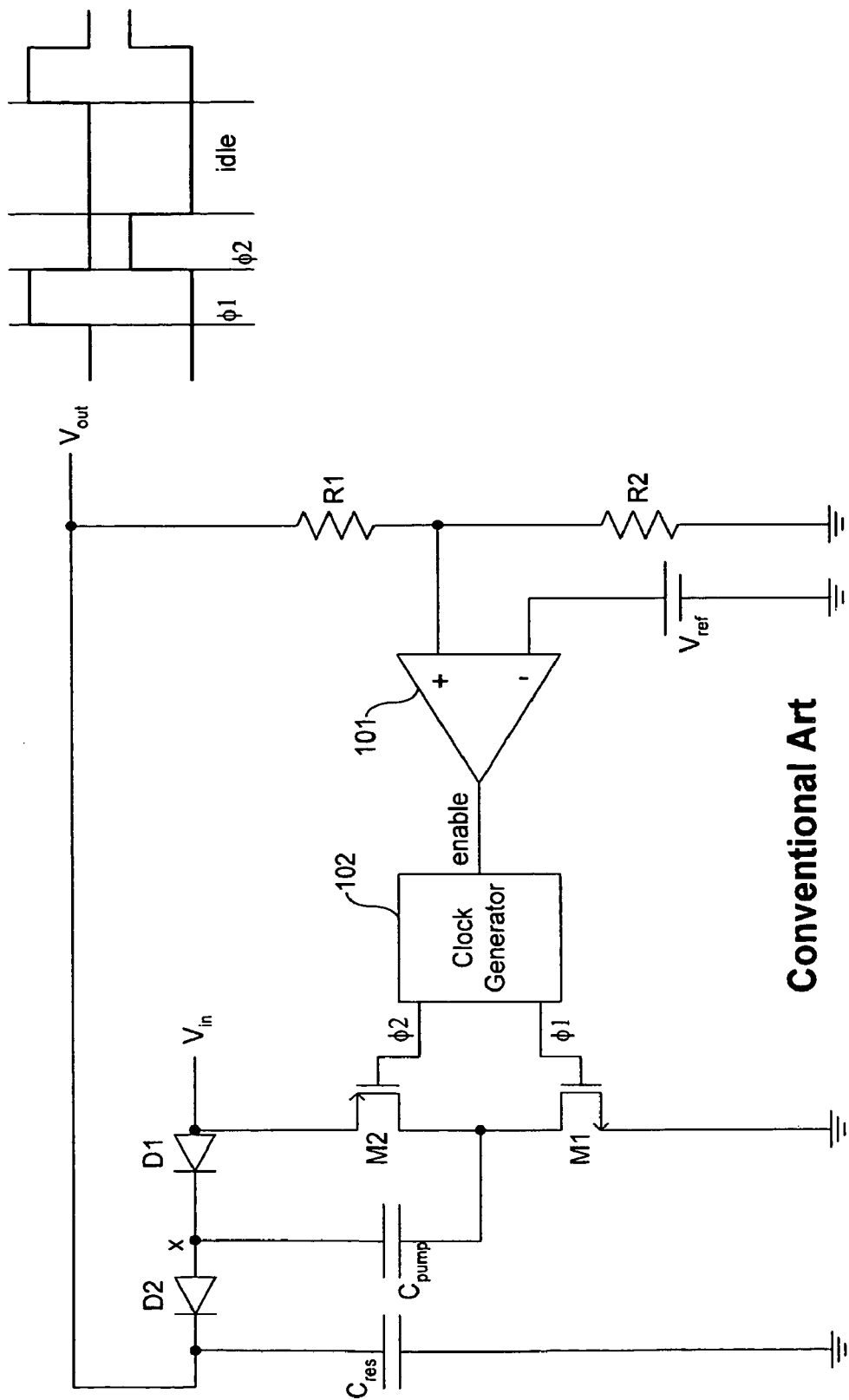
FIGS. 1A-1B illustrate a "skip" mode operation of a charge pump.
Figure 1B:
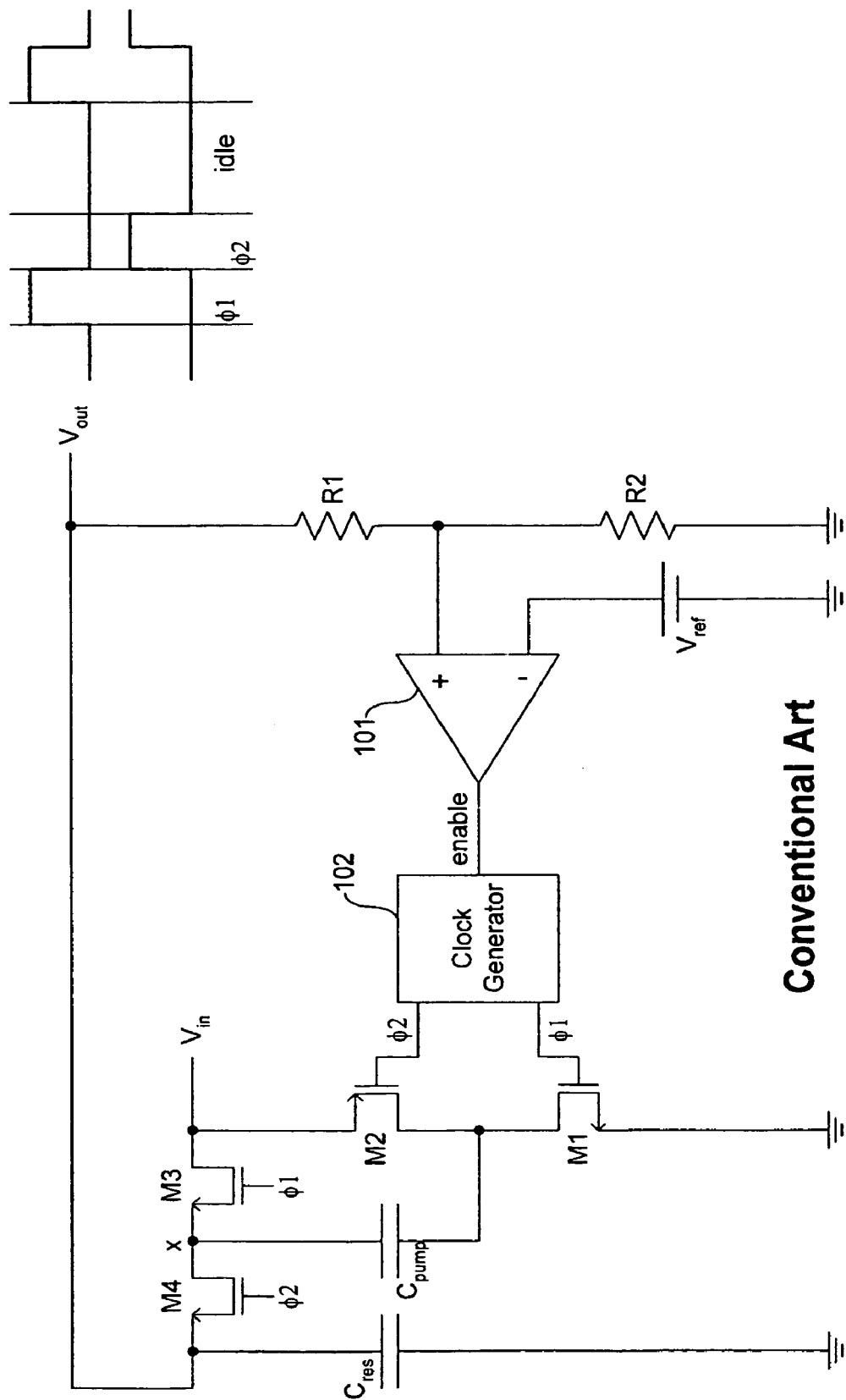
Figure 2:
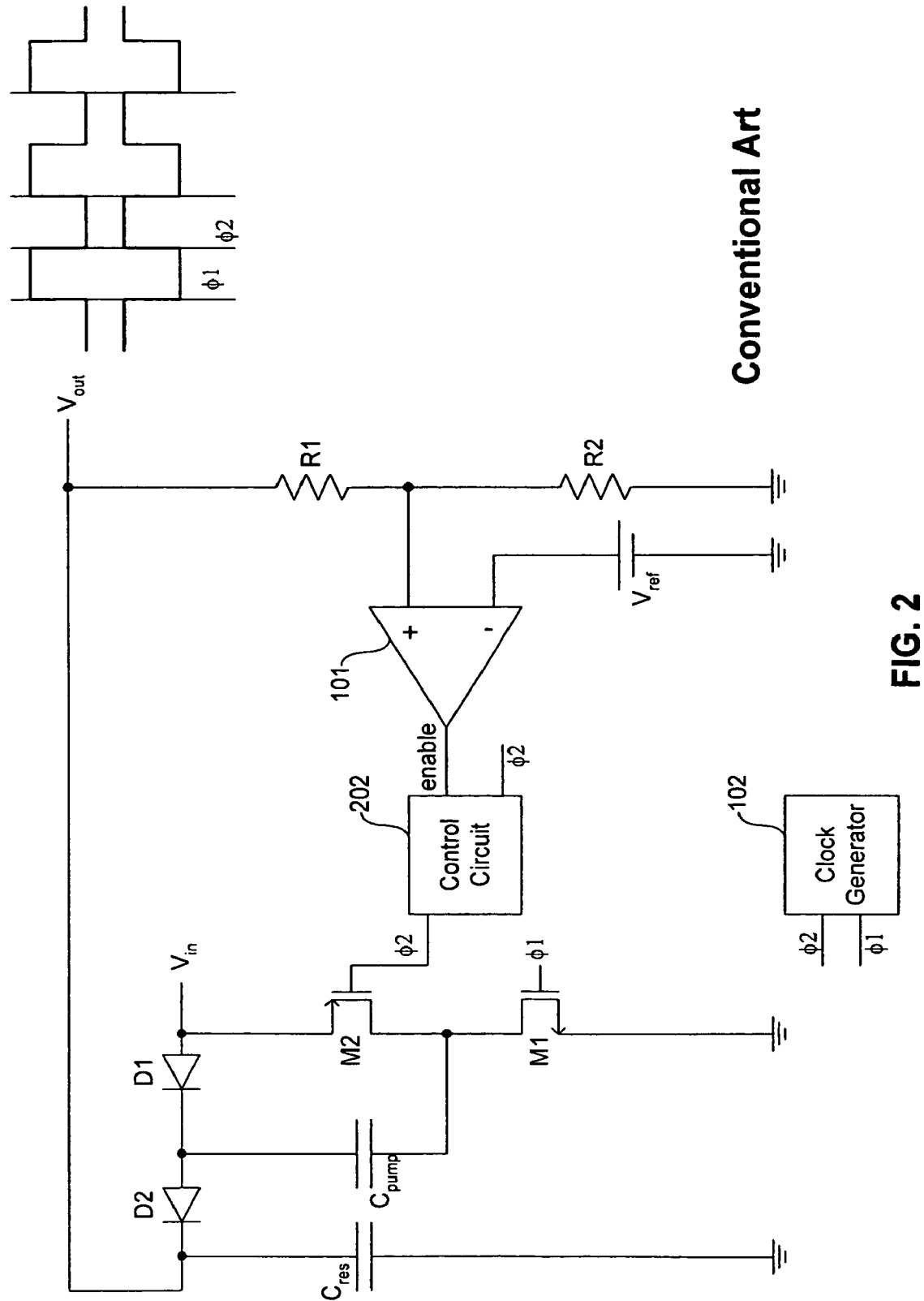
FIG. 2 illustrates a Dickson charge pump operating in a constant frequency mode.
Figure 3:
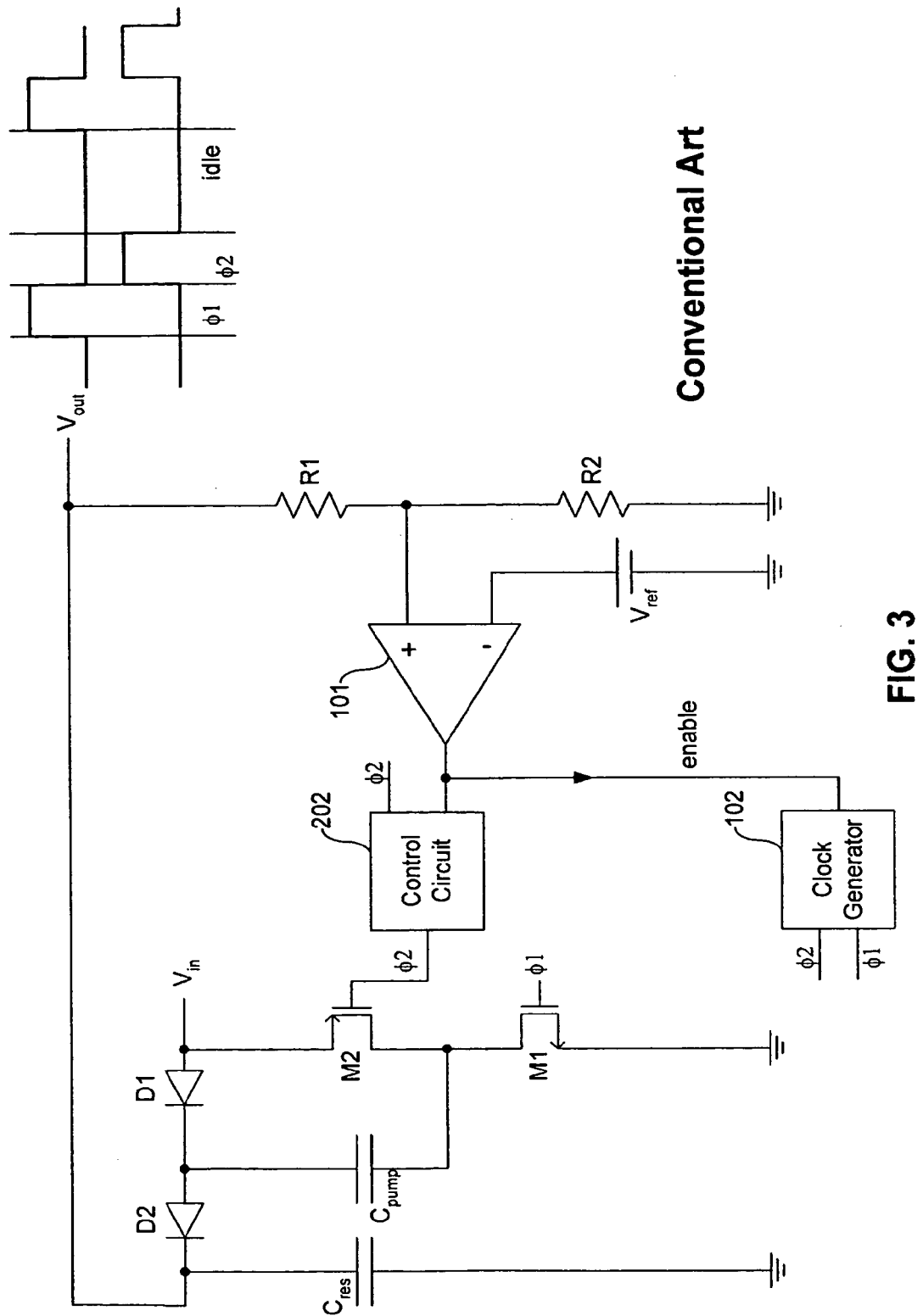
FIG. 3 illustrates an active control circuit used to control a charge pump.
Figure 4:
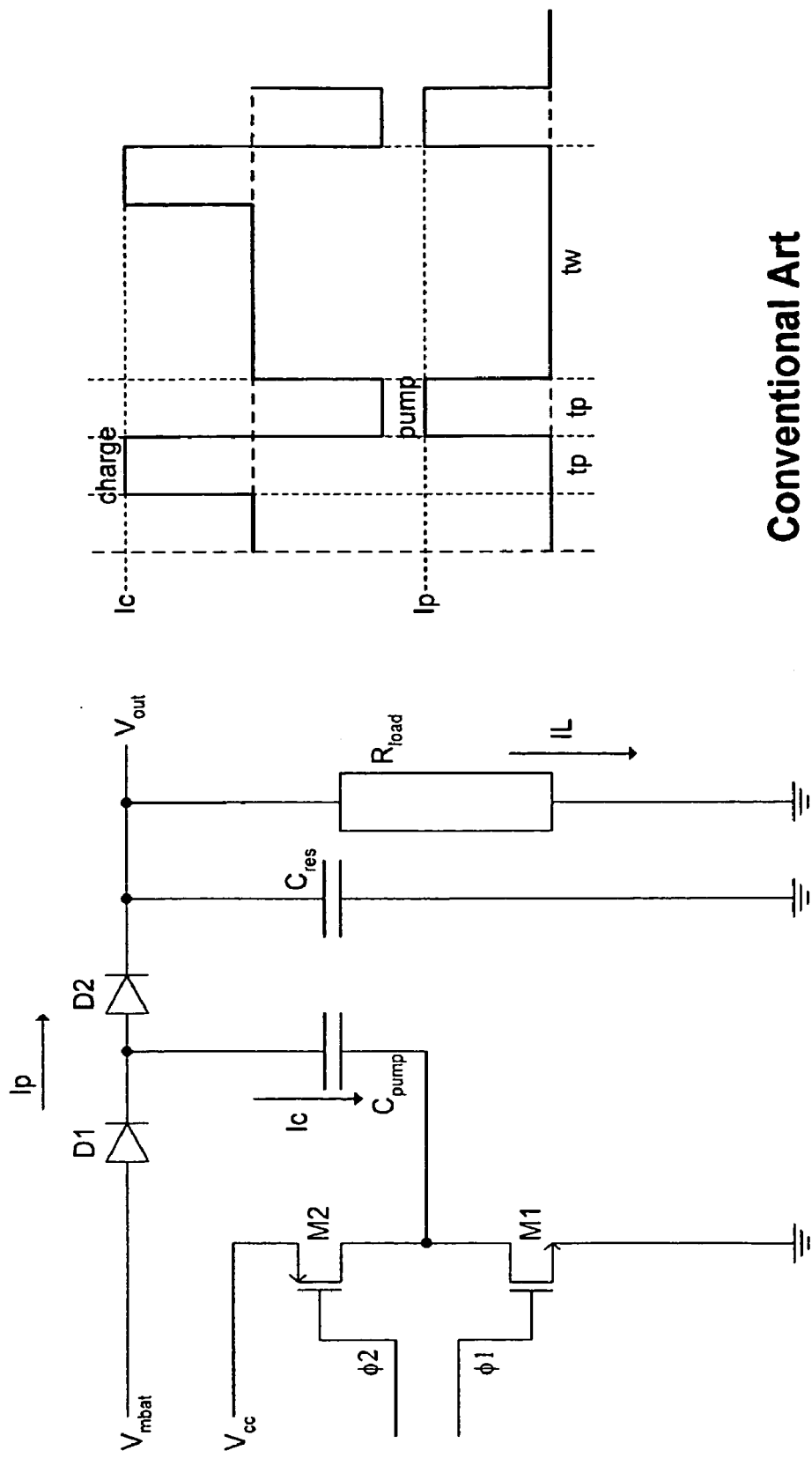
FIG. 4 illustrates an operating principle of the Dickson charge pump.

Resistance control is usually implemented in the control logic block 202 in FIG. 3. Conventionally, the control logic block 202 uses a PWM (pulse width modulation) controller, or a low-pass filter, to modulate the gate control voltage of M2 to achieve different on-resistances. These techniques involve compensation circuitry to keep the control circuit 202 stable. In this invention, a simpler, digitally-controlled resistance control circuit is implemented. The advantage of this technique is that it is both straightforward and inherently stable.

The invention replaces the conventional control circuit 202 shown in FIG. 3. Instead of using an analog voltage to control the on-resistances of the MOS switches (transistors) M1, M2, the on-resistances can be controlled digitally in discrete steps. It will be appreciated that the transistors M1, M2 are actually not two single transistors, but each one is multiple transistors arranged in parallel (not shown in the figures). By adjusting the number of parallel transistors of M1, M2 that are turned on at any given time in parallel, the total on-resistance effectively changes.

The number of steps of M1 and/or M2 can be chosen to suit a particular specification. In one example, 14 steps were chosen. The control circuit in this case consists of 14 D-flip-flops 501A-501N (see FIG. 5), 13 of which (501A-501M) are connected in series to form a shift register chain 502, and one D-flip-flop (501N) is set to be always on and only can be turned off by "skip" control. When its Q output is LOW, the transistors are disabled, and the circuit is in skip, or idle, mode.

Figure 5:
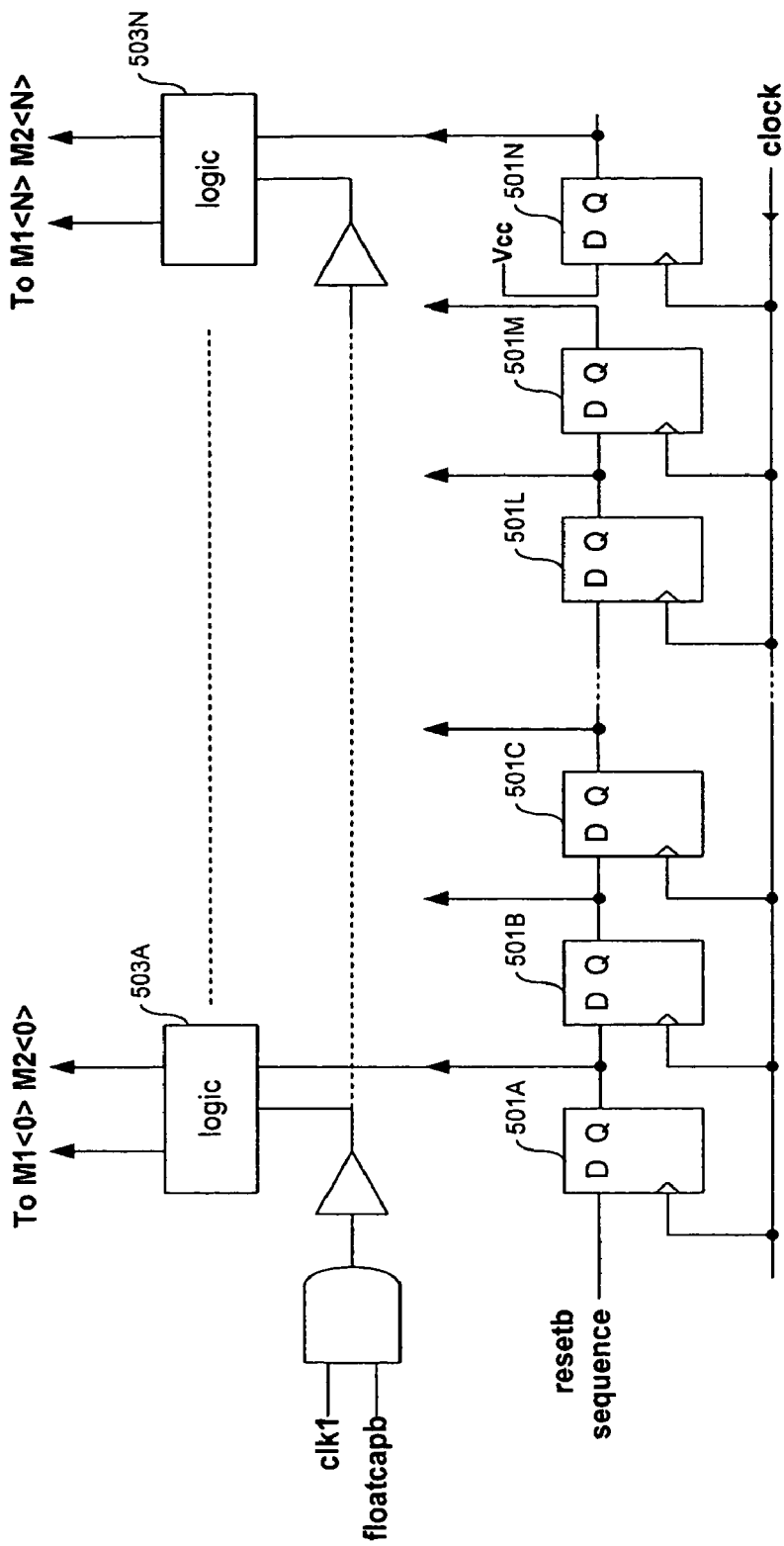
FIG. 5 illustrates a charge pump with a control circuit of the present invention.

FIG. 5 is a block diagram that depicts the shift register 502 configuration. The input to the first flip-flop 501A is the "RESETB" sequence, which is the output of the comparator 101. The "RESETB" sequence is then propagated across the shift register 502 by a clock signal. In this application, the shift register 502 "memorizes" the past 13 "RESETB" signals and applies them to control the on/off state of the switches M1, M2. A "RESETB" means the output voltage Vout is higher than the target value, and the "RESETB" signal takes a value of logic "0".

Each of the Q outputs of the DQ flip-flops 501A-501N of FIG. 5 controls a gate of each of these parallel transistors M1<0> . . . M1<N> and M2<0> . . . M2<N>, which collectively form the transistors M1, M2. Logic blocks 503A-503N control gates of the transistors M1<0> . . . M1<N> and M2<0> . . . M2<N> (i.e., the parallel transistors that make up M1 and M2). Furthermore, the control circuit 202 is shown in FIG. 5 as a shift register 502 composed of DQ flip-flops. However, the invention is not limited to the use of DQ flip-flops. For example, JK flip-flops and RS flip-flops can also be used. Other forms of shift registers can be used as well. Additionally, a state machine with a desired digital frequency response can be used, instead of a shift register. Also, only one shift register 502 is shown in FIG. 5, however, multiple shift registers may be used to achieve the desired frequency response and on-resistance of both M1 and M2.

Figure 6:
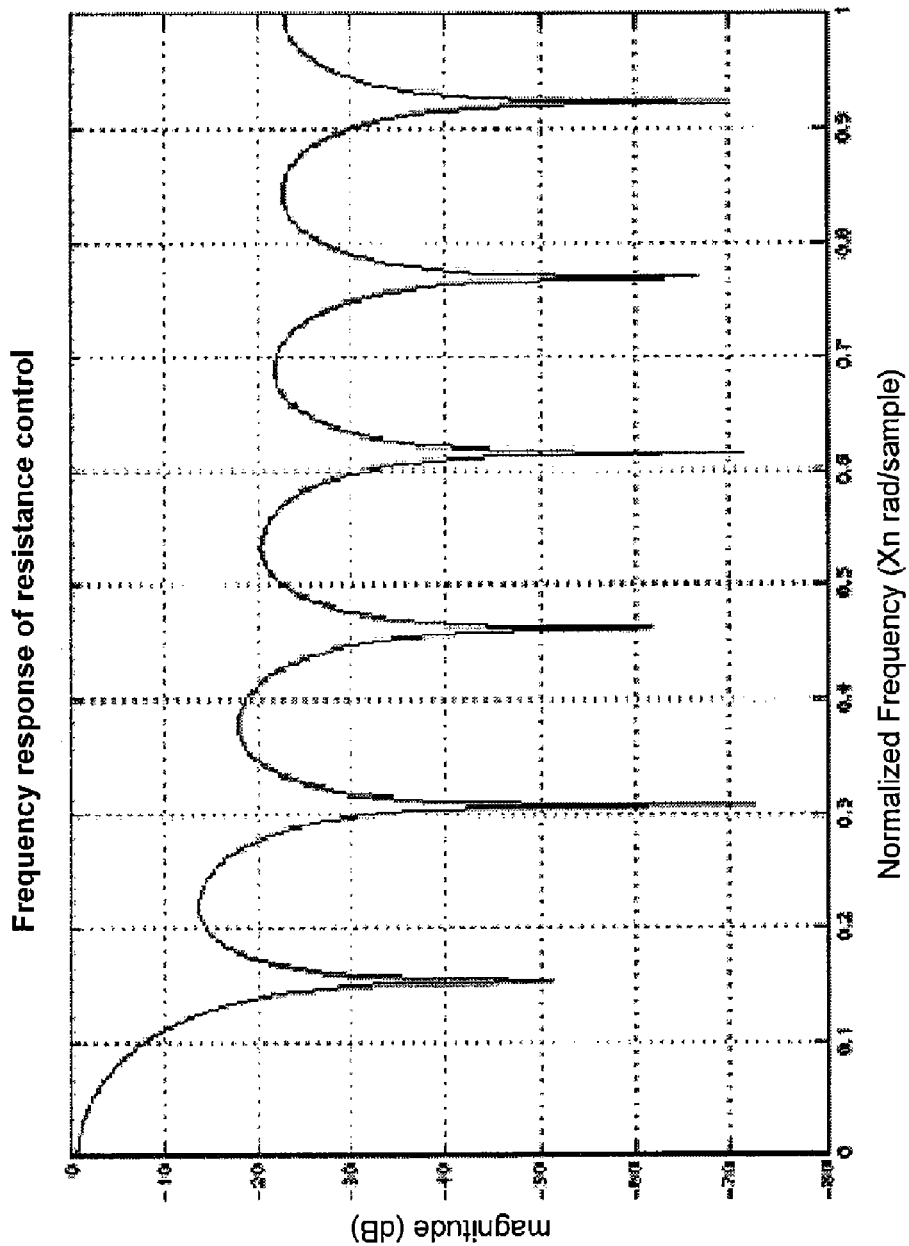
FIG. 6 illustrates a frequency response of the control circuit of the present invention.

The shift register 502 can also be viewed as an FIR (finite impulse response) filter to extract the average DC level of the "RESETB" sequence. The transfer function of the resistance control is:

$$Y[n] = \frac{G}{14}(x[n] + x[n-1] + \cdots + x[n-12])$$

$$Y(z) = \frac{G}{14}\left(\sum_{k=0}^{k=12} X(z)z^{-k}\right)$$

$$\frac{Y(z)}{X(z)} = H(z) = \frac{G}{14}\left(\sum_{k=0}^{k=12} z^{-k}\right)$$

where X(z) is the "RESETB" sequence in digital domain, and is either "1" or "0". A logic "1" corresponds to a output voltage is lower than the target value. A logic "0" corresponds to a voltage higher than the target value. G is the total conductance of all the transistors of M1, M2 in parallel. The frequency response of the resistance control is shown in FIG. 6, which essentially illustrates a low-pass response.

To illustrate the operation of the active-cycle control, consider the following example. Suppose the reservoir capacitor Cres has too much charge and the skip control stops the charge pump. Resistance control works simultaneously, tracking the past 13 clock cycles of the "RESETB" signal and increases the resistance accordingly. As the load keeps drawing current out of the capacitor Cres, the voltage Vout drops below the target value and the charge pump re-activates. At the same time, the total resistance of the switches M1, M2 is adjusted higher, so the charge pump will charge the capacitors (Cpump and Cres) in smaller steps.

On the other hand, if the resistance of M1, M2 is too high, the charge pump will rarely enter into the skip mode. The resistances of M1, M2 will decrease accordingly based on the last 13 clock cycles of the "RESETB" signal. In summary, the resistance control shift register 502 is both a counter that counts the number of reset cycles in the last 13 cycles, and it also serves as a "low pass filter" in the frequency domain to extract the DC signal so as to control the switch resistance.

Conclusion

Having thus described a preferred embodiment of a system and method, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A charge pump, comprising:
    a resistor divider coupled between an output voltage node and ground;
    a comparator inputting a reference voltage at one input, and a divided voltage from the resistor divider at another input;
    a state machine inputting a comparator output and configured to store a plurality of states;
    a first plurality of parallel transistors and a second plurality of parallel transistors in series between an input voltage node and the ground, each of the first and second plurality of transistors is variably controlled by the state machine; and
    a pump capacitor having a first terminal coupled to the output voltage node and a second terminal coupled between the first and second plurality of parallel transistors,
    wherein the first plurality of parallel transistors is configured as a discretely variable conductance having more than two states to charge the pump capacitor.

2. The charge pump of claim 1, wherein the state machine is configured to store 28 states.

3. The charge pump of claim 1, wherein each of the first and second pluralities of parallel transistors comprises 14 transistors connected in parallel.

4. The charge pump of claim 1, wherein a number of states in the state machine corresponds to a total number of transistors in the first and second pluralities of transistors.

5. The charge pump of claim 1, wherein the state machine comprises:
    a first plurality of flip flops connected in series, wherein outputs of the first plurality of flip flops control gates of the first plurality of parallel transistors; and
    a second plurality of flip flops connected in series, wherein outputs of the second plurality flip flops control gates of the second plurality of parallel transistors.

6. The charge pump of claim 1, further comprising a diode coupled between the input voltage node and the first terminal.

* * * * *